Sept. 6, 1927.
C. H. ERICSON
1,641,627
COUPLING FOR WIRES, ETC
Filed July 27, 1926
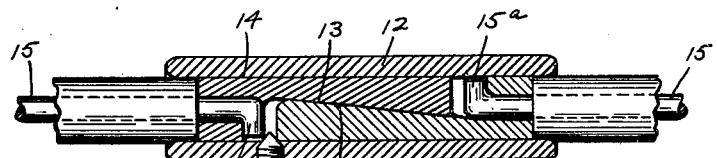
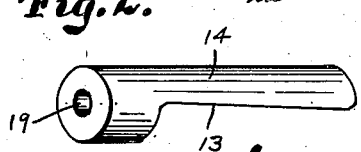 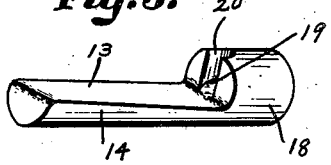
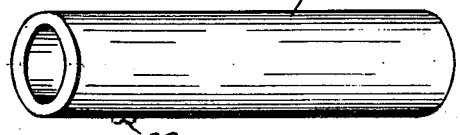
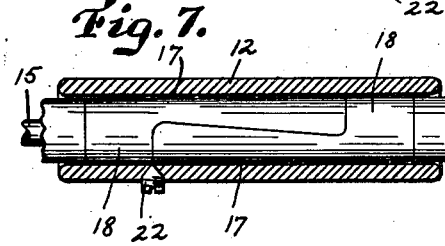 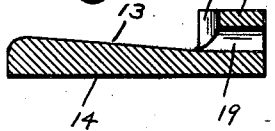 
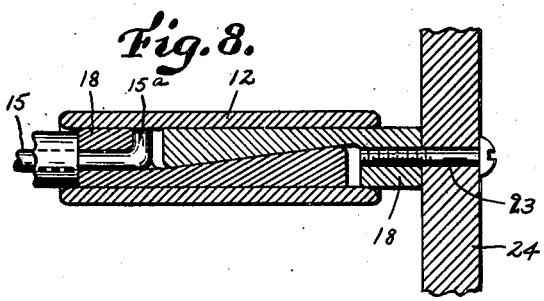
Inventor
Carl H. Ericson
by Wright Brown Quinby May
Attys.

Patented Sept. 6, 1927.

1,641,627

UNITED STATES PATENT OFFICE.

CARL H. ERICSON, OF BOSTON, MASSACHUSETTS.

COUPLING FOR WIRES, ETC.

Application filed July 27, 1926. Serial No. 125,175.

This invention relates to means for detachably connecting elongated sections or parts assembled in substantial alinement with each other, and may be embodied in means for detachably connecting the wire sections of a conductor of electricity, or sections used for other purposes.

The object is to provide a coupling of simple construction, adapted to be quickly and conveniently manipulated to make and break the connection, and adapted also to be caused to maintain the connection by longitudinal strain or tension exerted on the connected parts, and to permit the separation of the parts when they are not under tension.

Of the accompanying drawings forming a part of this specification,—

Figure 1 is a longitudinal section of my improved coupling showing in elevation portions of two conducting wires connected thereby.

Figures 2 and 3 are perspective views of the wedge members shown by Figure 1.

Figure 4 is a perspective view of the sleeve member shown by Figure 1.

Figure 5 shows in section one of the wedge members.

Figure 6 is a side view of a portion of one of the conducting wires.

Figure 7 is a view showing the sleeve member in longitudinal section and the wedge members in elevation, abutted closely against each other to release the binding connection between their outer surfaces and the bore of the sleeve member.

Figure 8 is a view similar to Figure 1, showing a modification.

The same reference characters indicate the same parts in all of the figures.

In the drawings, 12 designates a sleeve member which is open from end to end and has a bore of uniform diameter. Two wedge members are insertible in the bore of the sleeve member and are provided with means for engagement with conducting wires 15, or other parts to be connected by the coupling.

The wedge members are provided with complemental inner faces 13, which are inclined relative to the axis of the sleeve, and outer faces 14, formed to frictionally engage the sleeve bore.

The arrangement is such that when the wedge members are inserted in the sleeve and subjected to longitudinal strain tending to pull the members in opposite directions, this strain being caused, for example, by the tension exerted on the wires 15, the inclined faces 13 slip on each other, so that the outer faces 14 are pressed laterally outward into binding engagement with the bore of the sleeve member 12, and when the longitudinal strain ceases, the wedge members may be forced inwardly toward each other, until the binding engagement also ceases, so that the sleeve is removable from the wedge members. This will be clearly understood by comparing Figure 1 with Figure 7. Figure 1 shows the wedge members pulled outward and binding on the sleeve member, spaces 16 being formed between adjacent end faces of the wedge members. Figure 7 shows the wedge members forced inward, so that slight crevices 17 (shown somewhat exaggerated by Figuure 7) are formed between the sleeve bore and the outer surfaces of the wedge members. The sleeve as shown by Figure 7, is free to be moved endwise from th wedge members.

The means provided for engaging the parts 15 with the wedge members may be heads 18, loosely fitting the sleeve bore and provided with longitudinal sockets 19, adapted to receive end portions of the parts 15. Said end portions may be secured to the heads in any suitable manner. As shown by Figures 1, 3 and 5, the heads may be provided with recesses 20, formed to receive the outwardly bent ends 15ª of the parts 15. Said ends may be soldered in the recesses. The inner ends of the heads 18 form sides of the spaces 16, when the wedge members are moved outward, as shown by Figure 1.

To prevent the possibility of an accidental release or cessation of the binding engagement between the wedge members and the sleeve, I may provide the sleeve with adjustable stop means engageable with the wedge members when they are adjusted as shown by Figure 1, to prevent them from being moved inwardly to the positions shown by Figure 7. Said means may be embodied in a pointed screw 22, engaged with a tapped orifice in the sleeve 12, and adapted to be turned into one of the spaces 16, as shown by Figure 1, and form a stop preventing endwise movement of either wedge member. When the members of the coupling are to be separated, the screw is retracted, as shown by Figure 7.

One of the wedge members may be attached by a screw 23 to a fixed part 24, the screw engaging an internal thread in the socket 19 in the head of said member.

I claim:

1. A coupling comprising a sleeve member and two wedge members insertible in the bore of the sleeve member, and provided with means for engagement with parts to be connected by the coupling, the wedge members having complemental inner faces inclined relative to the axis of the sleeve, and outer faces formed to frictionally engage the sleeve bore, the arrangement being such that when the wedge members are inserted in the sleeve and subjected to longitudinal strain, their outer faces are pressed laterally outward into binding engagement with the sleeve bore, and the wedge members are rigidly connected by the sleeve, and when the longitudinal strain ceases, the wedge members may be forced inward toward each other until the binding engagement also ceases, and the sleeve is removable from the wedge members.

2. A coupling comprising a sleeve member and two wedge members insertible in the bore of the sleeve member and including heads loosely fitting the sleeve bore and provided with longitudinal sockets adapted to receive parts to be connected by the coupling, the wedge members including also wedge-shaped inner portions having complemental inner faces inclined relative to the axis of the sleeve, and outer faces formed to frictonally engage the sleeve bore, the arrangement being such that when the wedge members are inserted in the sleeve and subjected to longitudinal strain, their outer faces are pressed laterally outward into binding engagement with the sleeve bore, and the wedge members are rigidly connected by the sleeve, and when the longitudinal strain ceases, the wedge members may be forced inward toward each other until the binding engagement also ceases, and the sleeve is removable from the wedge members.

3. A coupling as specified by claim 1, the sleeve being provided with adjustable stop means engageable with the wedge members to confine the same in binding engagement with the sleeve bore.

In testimony whereof I have affixed my signature.

CARL H. ERICSON.